United States Patent [19]
Campo et al.

[11] Patent Number: 5,526,285
[45] Date of Patent: Jun. 11, 1996

[54] IMAGING COLOR SENSOR

[75] Inventors: Peter J. Campo, Niskayuna; John L. Schneiter, Latham; Walter V. Dixon, Delanson, all of N.Y.

[73] Assignee: General Electric Company, Schenectady, N.Y.

[21] Appl. No.: 131,231

[22] Filed: Oct. 4, 1993

[51] Int. Cl.$^6$ ................................................ G01J 3/00
[52] U.S. Cl. ........................................ 364/526; 356/405
[58] Field of Search .................................. 356/425, 326, 356/369, 405, 414, 419, 408; 364/526, 571.01; 348/720, 717; 250/226; 382/17

[56] References Cited

U.S. PATENT DOCUMENTS

| | | | |
|---|---|---|---|
| 3,986,777 | 10/1976 | Roll | 356/176 |
| 4,131,367 | 12/1978 | French et al. | 356/405 |
| 4,812,904 | 3/1989 | Maring et al. | 358/107 |
| 5,136,519 | 8/1992 | Yonemitsu | 364/526 |
| 5,157,506 | 10/1992 | Hannah | 364/526 |
| 5,317,648 | 5/1994 | Sawada et al. | 364/526 |
| 5,339,963 | 8/1994 | Tao | 364/526 |

OTHER PUBLICATIONS

"On–Line Color Monitoring & Control (CMC)"— Concept Description – Section II – pp. 12–30 General Electric produced document.
"COLOR"— Image Processing for GE Pellets Report regarding General Electric funded work Smith et al. (no date).
"Feasibility Study: Color Image Processing for Use in Colorimetric Quality Control"— GE Plastics Research Project Final Report – J. E. Smith, R. P. M. Craven, W. K. Preece, S. Mathews, C. Chaney – pp. 1–31 – Appendices A–E 1992 (no month).

Primary Examiner—Emanuel T. Voeltz
Assistant Examiner—Thomas Peeso
Attorney, Agent, or Firm—Marvin Snyder

[57] ABSTRACT

A device for measuring the color of a sample is provided comprising: a camera for transforming received light into electrical signals providing color information, the camera being positioned with respect to the sample to receive at least a portion of any light reflected by the sample; and a signal processor, coupled to the camera, for processing electrical signals produced by the camera to obtain the color information about the sample embedded in the signals.

23 Claims, 2 Drawing Sheets fig. 1 fig. 1a fig. 2 fig. 3

IMAGING COLOR SENSOR

RELATED APPLICATIONS

This application is related to patent application Ser. No. 08/378,993, filed Jan. 26, 1995, a continuation of now abandoned patent application Ser. No. 08/131,232, filed Oct. 4, 1993, entitled "A System for Controlling the Color of Compounded Polymer(s) Using In-Process Color Measurements," by Campo et al. assigned to the assignee of the present invention and herein incorporated by reference.

FIELD OF THE INVENTION

The invention relates to measuring the color of a sample and more particularly, to a device or sensor for measuring the color of samples having a variety of geometrical shapes and having one or more distinctly detectable colors.

BACKGROUND OF THE INVENTION

Plastics, such as thermoplastic polymers or thermoset polymers, may be used in a number of different commercial products. Industries employing polymers include the printing industry, the paint industry, the fabric industry, and the plastic industry. In a number of these products and industries, the color of the polymer product may be important.

Currently, most, if not all, precise measurements of object color are made by one of two devices: a tristimulus colorimeter or a reflectance spectrophotometer. These devices suffer from a number of disadvantages. These devices usually require flat object samples and precisely controlled viewing conditions in order to provide a satisfactory measurement of object color. This is particularly disadvantageous for the typical polymer product manufacturing environment. Furthermore, none of these devices provide spatial resolution of the color measurements, that is the ability to obtain color measurements for multiple locations on the surface of the object or sample. In fact, these devices often render a single measurement of the "average" color of the sample within the field of view of the instrument or device. In addition, these devices tend to be expensive due to the manufacturing care necessary to construct a device capable of providing precise color measurements suitable for laboratory use.

Video cameras may be used to measure the color of objects, such as polymer samples, as well. However, these also suffer from disadvantages, such as the lack of precision of the color measurements obtained, the restriction that the object being measured be a flat sample, and the possibility of the need for human intervention during the measurement process to correct for significant errors that may arise from such an approach. Therefore, a need exists for an automated, nondestructive, noninvasive, economical and relatively time-efficient method or device that allows for the precise measurement of color in a manufacturing environment so that real-time information regarding sample color, such as a sample from a compounded polymer mixture, may be obtained.

SUMMARY OF THE INVENTION

One object of the invention is to provide a device for measuring the color of a nonplanar sample.

One more object is to provide a device for measuring color that provides spatial resolution, that is, a device permitting one or more color measurements to be obtained from one or more locations on the surface of a sample so that samples that are not substantially uniform in color may be measured.

Another object is to provide a device for precisely measuring color that may be employed in a manufacturing environment and that provides real-time information regarding the color of a sample.

Yet one more object is to provide a device for measuring color that is completely automated and requires no human intervention to obtain color measurements.

Yet another object is to provide a device for measuring color that may measure any differences in color between a standard color sample and another object or sample.

Briefly, in accordance with one embodiment of the invention, a device for measuring the color of a nonplanar sample comprises: a camera for transforming received light into electrical signals providing color information, the camera being positioned with respect to the sample so as to receive at least a portion of any light reflected by the sample; and a signal processor, coupled to the camera, for processing electrical signals produced by the camera to obtain the color information about the sample embedded in the electrical signals.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may be best be understood by reference to the following detailed description when read with the accompanying drawings in which:

DETAILED DESCRIPTION OF THE INVENTION

Figure 1:
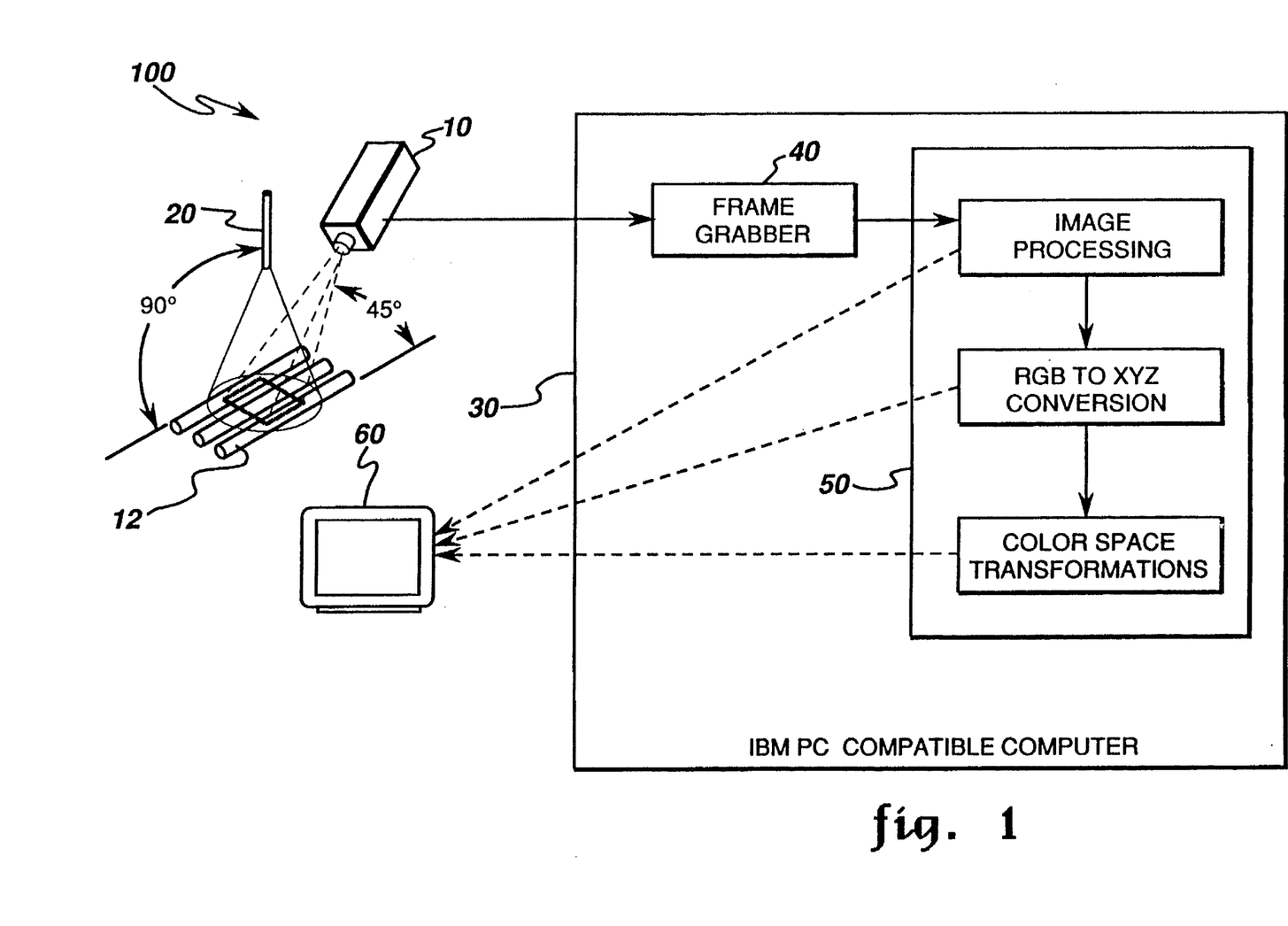
FIG. 1 is a schematic diagram illustrating one embodiment of an imaging color sensor in accordance with the invention.

FIG. 1 is a schematic diagram of an embodiment 100 of an imaging color sensor or a device for measuring the color of a sample in accordance with the invention. Color sensor 100 may comprise a three-color camera 10, a light source 20, and a signal processor 30. In the context of the invention, the term three-color camera refers to a camera, such as a still camera or a video camera, providing, in the form of analog or digital electrical signals, three linearly independent color signals for an object or sample viewed with the camera, the signals corresponding to the three color dimensions in color space, described in more detail hereinafter. Likewise, the term RGB camera refers to a three-color camera providing RGB (red-green-blue) color signals, in the form of analog or digital electrical signals, regarding the object or sample viewed with the camera. Examples of three-color cameras include, for example, CCD video cameras, CID video cameras, vidicon tube video cameras, CCD still cameras, CID still cameras, CCD line scan cameras, and CID line scan cameras.

As illustrated, light source 20 may illuminate the object or sample whose color is to be measured. Nonetheless, the invention is not restricted in scope to including a dedicated light source. For example, ambient light reflected from the object or sample may provide satisfactory performance. As illustrated in FIG. 1, light source 20 in this embodiment comprises a fiber optic light delivery system. Nonetheless, in embodiments including a light source, any light source will suffice, such as, for example, a light bulb or light projector. Although not required for satisfactory performance, the performance of an imaging color sensor in accordance with the invention may also be improved if the intensity of the light source is known, controlled, or calibrated.

One aspect of an imaging color sensor in accordance with the invention is the capability to measure the color of a nonplanar object having a known or substantially predetermined geometry using a conventional three-color camera. As will be appreciated by one skilled in the art, typically the shape of an object or sample may ultimately affect the color measurements obtained for the sample due to shading or the effect the object geometry has on the perceived object color due to the reflection of light. One aspect of an imaging color sensor in accordance with the invention is to compensate or adjust the color measurements obtained due to this shading or due to the effect of the geometry of the sample on the reflection of light and, hence, the perceived sample color. In FIG. 1, nonplanar sample 12 is illustrated as substantially parallel, substantially cylindrical, strands of a compounded polymer mixture, although, as suggested, the invention is not restricted in scope to measuring the color of a compounded polymer mixture in the form of cylindrical strands. For example, alternately, the compounded polymer mixture may be in the form of a tube, web, film, sheet, substantially flat plaque, or pellet-shaped object.

Camera 10 is positioned with respect to light source 20 and strands 12 so as to receive a portion of the light emitted by source 20, and reflected by the strands. Where a light source is not provided, camera 20 should nonetheless be positioned so as to receive a portion of the light reflected by the sample, such as by strands 12. In FIG. 1, the strands are oriented in a plane substantially perpendicular with respect to the path of the light emitted by the light source. More particularly, the strands have substantially parallel, longitudinal axes, the axes all lying substantially in the same plane. Likewise, the camera is oriented so as to receive the light reflected from the strands, the reflected light having a path of reflection along a line oriented approximately 45° with respect to the plane containing the longitudinal axes of the strands. The line constituting the path of reflection may also lie in another plane that may include the longitudinal axis of one of the strands. Thus, the path of reflection of the reflected light is oriented along the longitudinal axes of the strands at approximately a 45° angle with respect to the plane containing the longitudinal axes of the strands. It will nonetheless be appreciated that the invention is not restricted in scope to these particular angular orientations.

Camera 10, in this particular embodiment, a Sony Model DXC-960-MD, is adapted to transform received light into electrical signals providing color information. Where the camera comprises an RGB video camera, such as a one chip or three chip CCD camera, the color information about the object constitutes RGB color signals or signal values. Nonetheless, the invention is not restricted in scope to RGB color signals. Any three linearly independent color signals will suffice. The transformation of received light into electrical signals providing color information is known in the art and described in more detail in, for example, *Television Engineering Handbook*, written by K. B. Benson, and available from McGraw-Hill (1986).

It will now be appreciated that in general the color of a sample, such as a polymer sample, may be specified by no less than three linearly, independent color parameters or color signals. See, for example, *Color in Business, Science, and Industry*, written by D. B. Judd and G. Wyszecki, and available from John Wiley & Sons (1975). Each of these three parameters or signal values may, therefore, be adjusted individually to affect color and, in the context of the invention, these three signals are referred to as the three color dimensions in color space.

Signal processor 30 is coupled to camera 10 and processes the electrical signals produced by the camera to obtain the color information about the sample embedded in the electrical signals. In this particular embodiment, signal processor 30 may comprise an IBM PC compatible computer. Nonetheless, the invention is not restricted in scope to an IBM personal computer or an IBM PC compatible computer.

As illustrated in FIG. 1, signal processor 30 may comprise a digital image processor 50, and a frame grabber 40, such as a video frame grabber, coupled to the digital image processor, for transforming the electrical signals, typically either digital RGB signals or analog RGB signals, into an RGB digital image. Frame grabbers are known in the art and typically perform analog-to-digital conversion for an image produced by an analog video camera and store the resulting digital image. Frame grabbers, including video frame grabbers, are available from a variety of manufacturers, such as Data Translation, Imaging Technology Incorporated or Matrox Electronics. An alternative analog-to-digital conversion process for a color image is also described in U.S. Pat. No. 4,812,904, "Optical Color Analysis Process," by Maring et al., issued Mar. 14, 1989, and herein incorporated by reference. Although illustrated as within signal processor 30, the frame grabber may be physically separate from, but electrically coupled to, the remaining portion of the signal processor. Likewise, where a digital three-color camera is employed, a frame grabber may be unnecessary. Likewise, as illustrated in FIG. 1, signal processor 30 may be electrically coupled to a video monitor 60 for viewing the results provided by the digital image processor.

As will be explained in more detail hereinafter, digital image processor 50 performs the processing of the electrical signals to adjust or compensate for various effects that may degrade the precision or quality of the color measurements obtained. For example, as previously suggested, the reflection of light from a nonplanar sample may affect the color measurement obtained. Thus, digital image processor 50 may be adapted to perform reflectance compensation of a three-color digital image, such as an RGB digital image. Such a three-color digital image may be provided by frame grabber 40 or it may be provided directly by a digital three-color camera. Thus, the digital image processor may compensate for the shape of the sample, such as, for example, a substantially cylindrically-shaped polymer strand, or a substantially pellet-shaped sample. More precisely, digital image processor 50 may process a three-color digital image, such as an RGB digital image, for a nonplanar sample into a three-color digital image for a substantially planar sample made of the same material and having substantially the same color. As explained in more detail hereinafter, the digital image processor may also low-pass filter the digital image, or compensate the image for the effects of nonuniform illumination of the sample by the light source, or compensate the image for the effects of other optical anomalies that may affect the measurement of the color of the sample. Likewise, where the sample includes at least two measurably different or distinct colors at two respective locations on its surface, the image processor may be adapted to process the digital image so as to differentiate between the different colors on the surface of the sample at the different locations. Likewise, the digital image processor may be adapted to differentiate between the color of two similarly shaped samples, such as the color at two substantially corresponding locations on the surface of the samples.

An imaging color sensor or device for measuring the color of a sample may operate in accordance with the following method. Light reflected from the sample, such as polymer strands 12, may be transformed into electrical signals providing color information, such as RGB, or other three color, analog signals. This process is described in more detail in the aforesaid Benson text. Next, the RGB analog signals, for example, may be converted to an RGB digital image, such as by video frame grabber 40. This RGB digital image may then be processed or transformed by any one of a number of different methods. For example, this RGB digital image may be low-pass filtered to obtain a smoothed RGB digital image. Alternatively, or in addition, the RGB digital image may be reflectance compensated to compensate for the shape of the nonplanar sample. This reflectance compensation may include transforming the RGB signals received from a nonplanar sample to correspond to RGB signals received from such a sample were the sample, substantially planar. In this way, the color of a substantially planar sample is obtained by transforming the RGB signals received from a nonplanar sample rather than physically transforming the nonplanar sample itself. Likewise, alternatively or in addition, the RGB digital image may be illumination compensated to compensate for the effects of a nonuniform illumination of the sample. This image processing, including filtering, illumination compensating, and reflectance compensating, is illustrated in FIG. 1 as being performed by signal processor 50. The compensated or transformed RGB digital image may then be reduced to an RGB color signal for the sample. The RGB color signal may then be transformed into a tristimulus (XYZ) color signal, also illustrated in FIG. 1. Furthermore, an XYZ color signal may be further transformed, such as illustrated in FIG. 1, to another three-dimensional color signal, such as described in the aforementioned Judd and Wyszecki text.

The RGB, XYZ or further transformed XYZ color signals may be employed, for example, in a closed loop feedback control system, such as that described in greater detail in aforesaid patent application Ser. No. 08/378,93 entitled "A System for Controlling the Color of Compounded Polymer(s) Using In-Process Color Measurements," by Campo et al.; however, alternatively, the RGB color signal obtained as previously described may be employed to perform closed loop feedback control instead.

Transforming light reflected from the sample into electrical signals may be accomplished by camera 10 illustrated in FIG. 1. More particularly, the sample may be illuminated by a light source emitting light of a known intensity, although the invention is not limited in scope to a dedicated light source or to one emitting light of a known intensity. For example, although not necessary for satisfactory performance, the light source may be calibrated to closely imitate or mimic one of the CIE standard illuminants, such as discussed, for example, in *Color Science: Concepts and Methods, Quantitative Data and Formulae*, written by Wyszecki and Stiles, and available from John Wiley & Sons (1982). Next, the light emitted by the light source and reflected from the sample may be received by the camera, such as three-color camera 10 illustrated in FIG. 1. The light source, where included, and camera should both be oriented with respect to the sample so that light is reflected along a path of reflection to be received by the optical signal receiving element of the camera, such as a lens. The previously described sequence of steps may be referred to as imaging the sample.

Figure 1A:
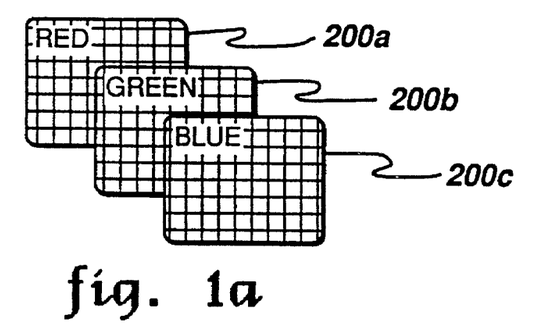
FIG. 1a is a schematic diagram illustrating three subimages or arrays of signal values that may be produced for further signal processing by an imaging color sensor in accordance with the invention.

The camera may then transform the received reflected light into three-color electrical signals providing color information, such as RGB analog signals in this particular embodiment, about the sample imaged. As previously described, these analog electrical signals are provided to signal processor 30. Likewise, signal processor 30 may include frame grabber 40 transforming the analog electrical signals into a three-color digital image. Alternatively, camera 10 may comprise a digital camera providing three-color digital signals, such as RGB digital signals, which may be stored as an RGB digital image directly. The RGB digital image may comprise digital representations of the red, green and blue signal components of the image at each pixel location in a 640×480 rectangular array or sub-image of pixels, although the invention is not limited in scope to an array of this particular size. In particular, in the case of a line scan camera, the rectangular signal component array may have as few as one row or column. Typically, each color signal value at each pixel comprises eight bits of binary signal values representing discrete signal values from 0 to 255, although the invention is not limited in scope to 8 bit binary signal values. Thus, each pixel location may include an eight bit signal value for each of the three-color signal components, for example, red, green and blue signal components, thereby providing three respective arrays of signal values. These respective sub-images or arrays of signal values are illustrated in FIG. 1a as arrays 200a, 200b, and 200c.

Once the three-color or RGB digital image, comprised of the three sub-images or arrays of signal values, is stored, it may be transformed as described hereinafter to provide precise color signal measurements about the sample. Modifications and variations of the approach described may occur to one skilled in the art. The technique described has been employed to economically obtain precise color measurements of samples in a changing manufacturing environment with improved sample shape flexibility. It is the intention to cover all such modifications and variations that fall within the scope of the invention as claimed and described herein.

Depending on the particular embodiment of a method for measuring the color of an object in accordance with the invention, the RGB or three-color digital image may first be illumination compensated. The approach employed to some extent utilizes simplifying assumptions, nonetheless, these simplifying assumptions in the context of the invention result in satisfactory performance regarding measuring the color of a sample object or objects. Thus, it is assumed that if the camera is employed to obtain a three-color digital image for a standard sample that is substantially uniform in color and if the illumination is likewise substantially uniform, the camera should obtain substantially uniform or flat signal values for the pixel locations in the three respective signal value arrays corresponding to the location of the sample in the field of view of the camera. Thus, the camera may be employed to measure the color of a sample that is known to be substantially uniform in color. Any resulting variation in the color signal values within an array may then be attributed to illumination variations. Likewise, by assuming such variations in illumination are substantially constant or time invariant, knowledge of these variations may be used to compensate the three-color digital image obtained when measuring the color of an sample to offset or remove any illumination variations attributable to the light source, viewing conditions or variations in camera sensitivity from pixel to pixel, or other possible optical anomalies.

One technique for determining the illumination compensation to be applied to the three-color, or RGB image is now described. As previously discussed, the intensity of the light source need not be calibrated or known. Thus, for each of a number of standard samples measured, such as ten such samples, a two-dimensional "fit" of each signal value array of three-color signal values may be obtained in accordance with the following equation:

$$P_{ij} = [f_0(i) f_1(i) \ldots f_k(i)] \begin{bmatrix} c_{00} & c_{01} & \ldots & c_{0l} \\ c_{10} & . & & \\ . & & & \\ . & & & \\ . & & & \\ c_{k0} & & & c_{kl} \end{bmatrix} \begin{bmatrix} g_0(j) \\ g_i(j) \\ . \\ . \\ . \\ g_l(j) \end{bmatrix}, \quad [1]$$

where $P_{ij}$ is the $(i, j)^{th}$ signal value in the array of signal values for one of the three color signal arrays, $f_a(x)$ is the $a^{th}$ basis function, f, evaluated at x, $g_a(x)$ is the $a^{th}$ basis function, g, evaluated at x, and matrix C contains the coefficients for the two dimensional fit. This is performed for the red, green and blue arrays, or other color signal arrays, produced for each standard sample. In principle, any of a number of basis functions may prove satisfactory for these purposes and the invention is not restricted in scope to any particular basis function. Furthermore, the $f_a(x)$ and $g_a(x)$ basis functions need not be the same. Nonetheless, Taylor polynomials of the form $$p(x) = a_0 30\, a_1 x + a_2 x^2 + \ldots, \quad [2]$$

where order two or three for such polynomials is employed has proven adequate in actual practice. Equation [1] above may be rewritten as a matrix equation as follows:

$$P = F_1 C F_2, \quad [3]$$

which may be conventionally solved for the minimum least squares error solution, such as described in *Linear Algebra and Its Applications*, written by G. Strang and available from Academic Press (1980), using the pseudo-inverse, designated †, as follows:

$$C = F_1^\dagger P F_2^\dagger. \quad [4]$$

Now, with measurements for at least two standard samples, the matrix, C, may be employed to obtain an expression providing color signal sensitivity and color signal bias attributed to nonuniform illumination for each pixel location in each respective array as follows. It is desired to obtain an equation of the form $$P_{ij} = S_{ij} \bar{P} + B_{ij} \quad [5]$$

which relates the average three-color signal value in the particular array of signal values, $\bar{P}$, to each measured signal value in the particular array, $P_{ij}$. $S_{ij}$ and $B_{ij}$ are, respectively, elements of the sensitivity matrix, S, and the bias matrix, B.

Two dimensional fits of the pixel sensitivity, S, and the color signal bias, B, may be obtained by solving equation [6] below by the following minimum least squares technique.

$$\begin{bmatrix} C_1 \\ C_2 \\ . \\ . \\ . \\ C_i \end{bmatrix} = \begin{bmatrix} \bar{P}_1 I & I \\ \bar{P}_2 I & I \\ . & . \\ . & . \\ . & . \\ \bar{P}_i I & I \end{bmatrix} \begin{bmatrix} C_S \\ C_B \end{bmatrix}, \quad [6]$$

where $C_i$ denotes the coefficient matrix for sample i derived in accordance with equation [4], $C_S$ denotes the coefficient matrix for the color signal sensitivity, S, and $C_B$ denotes the coefficient matrix for the color signal bias, B. The solution may now be obtained in accordance with the following equation:

$$\begin{bmatrix} C_S \\ C_B \end{bmatrix} = \begin{bmatrix} \bar{P}_1 I & I \\ \bar{P}_2 I & I \\ . & . \\ . & . \\ . & . \\ \bar{P}_i I & I \end{bmatrix}^\dagger \begin{bmatrix} C_1 \\ C_2 \\ . \\ . \\ . \\ C_i \end{bmatrix}, \quad [7]$$

Having obtained matrices $F_1$, $F_2$, $C_S$, and $C_B$, it is possible to compensate the three-color digital image for nonuniform illumination to produce an illumination compensated three-color, or RGB, digital image in accordance with the following equations:

$$\tilde{P}_{ij} = (P_{ij} - B_{ij}) + S_{ij}, \quad [8a]$$

or $$\tilde{P} = (P - F_1 C_B F_2) + F_1 C_2 F_2, \quad [8b]$$

where $P_{ij}$ represents the three-color signal value, such as an RGB signal value at the $i, j^{th}$ pixel location in a particular color signal array, and $\tilde{P}_{ij}$ represents the illumination compensated color signal value for that particular color signal array. Likewise, in equation [8b] above, "≈" above denotes the element by element division of two matrices. Thus, the three-color digital image may be compensated for nonuniform illumination by processing the color signal value at each pixel location for each color signal array value in accordance with previously provided equations [8].

It will now be appreciated that many other nonuniform illumination compensation techniques may be employed that will also provide satisfactory performance. A minimum least squares approach has been employed to provide a two-dimensional fit of the color signal values in each color signal array using polynomials. As was previously suggested, the invention is not restricted in scope to the conventional polynomial approach. One advantage of the two-dimension fit described above is computational efficiency and economies in the use of memory. However, less computationally efficient approaches may be employed, such as determining a different pixel sensitivity $S_{ij}$ and pixel bias $B_{ij}$ for every pixel location in the color signal arrays based on the three-color signal values obtained for the standard samples substantially uniform in color. For large color signal arrays this would prove to be a computationally intensive compensation procedure. The effect of the two-dimensional fit is to reduce the color information contained in the color signal arrays or sub-images to a more compact form, that is the matrix C. Likewise, a linear relation was employed in equation [5] to provide the nonuniform illumination compensation. Other possibly nonlinear relations, such as, for example, a second order polynomial relation, may also provide satisfactory performance. The invention is also not restricted in scope to employing a minimum least squares approach. For example, other approaches might include nonlinear techniques, such as utilizing a minimum absolute error or neural net approach. The minimum least squares approach described was employed to obtain illumination compensation that is locally valid. This process was described for substantially planar standard samples. Nonetheless, it may be performed for samples of varying shapes and sizes other than substantially planar objects. Likewise, it may be desirable to structure the sample viewing geometry and illumination conditions to reduce such nonuniform illumination effects.

It may also be desirable to determine the color signal sensitivity and the color signal bias, as previously described, after any changes in the operating environment, such as, for example, a change in the light source or a change in the viewing environment. Alternatively, a neural network approach to provide a nonlinear illumination compensation, such as described in *Introduction to Artificial Neural Systems*, by Zurada, and available from West Publishing Company (1992) or in *Neural Networks for Control*, edited by Miller III, Sulton, and Werbos, and available from MIT Press (1990), may be employed to provide compensation illumination for regions beyond a locally valid region compensated as described above. As will now be appreciated by one skilled in the art, once the desired illumination compensation scheme is determined, the illumination compensation signal transformation, including calibration to known or standard samples, may be completely automated, thereby removing the need for any human intervention, including the presentation of the samples to the camera.

Depending on the particular embodiment, the three-color digital image may alternatively, or in addition to being illumination compensated, be smoothed or low-pass filtered to eliminate noise, such as by conventional digital signal filtering, as described in, for example, *Digital Signal Processing*, written by Oppenheim and Schafer and available from Prentice-Hall, Inc. (1975). This noise may be due, at least in part, to the electronics of the camera, such as timing inaccuracies giving rise to "pixel jitter." The RGB or three-color digital image may be filtered before or after it is transformed to compensate for the effects of nonuniform sample illumination.

The three-color or RGB digital image, alternatively or in addition to being low-pass filtered or illumination compensated, may be reflectance compensated. One aspect of an imaging color sensor in accordance with the present invention is the flexibility it provides regarding different sample geometries. This flexibility is due, at least in part, to reflectance compensation, as described in more detail hereinafter, which may transform the color signal values of an RGB, or other three color, digital image for a nonplanar sample to an RGB, or other three color, digital image for a substantially planar sample made of the same material and having substantially the same color. Thus, various sample geometries may be reflectance compensated to provide an equivalent three-color digital image for a substantially planar sample. As previously suggested, the transformed three-color digital image may then be employed or reduced to obtain as a measure of the color of the sample, such as an RGB color signal for use in a manufacturing environment, such as described in aforementioned patent application Ser. No. 08/378,993. Alternatively, a transformed RGB digital image may be reduced to an RGB color signal which may then be transformed to an XYZ or other three-color signal, as described hereinafter.

Figure 3:
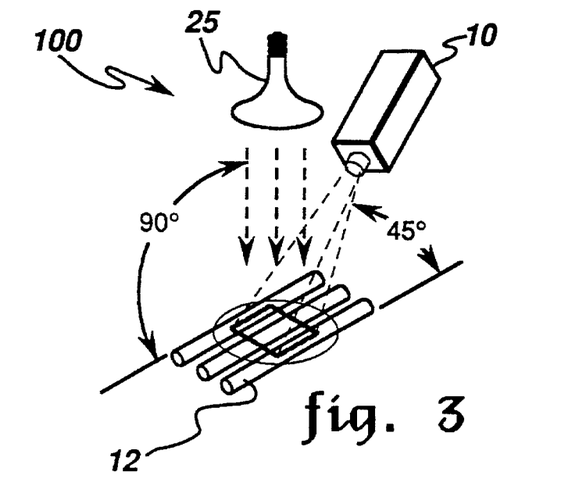
FIG. 3 is another embodiment of an imaging color sensor in accordance with the invention.

In this particular embodiment of a method for measuring the color of a sample in accordance with the invention, the sample viewing and illumination configuration illustrated in FIG. 3 is employed, although the invention is not restricted in scope to this particular configuration. FIG. 3 is similar to the embodiment illustrated in FIG. 1 except that a conventional light bulb 25 is employed as the light source. As previously illustrated and described, illumination is provided from directly overhead perpendicular to the plane including the longitudinal axes of the strands and camera 10 views the strands or receives light reflected from the strands along a line of reflection that is substantially along the longitudinal axes of the strands, but elevated at an angle of approximately 45° from the plane including the longitudinal axes of the strands.

Figure 2:
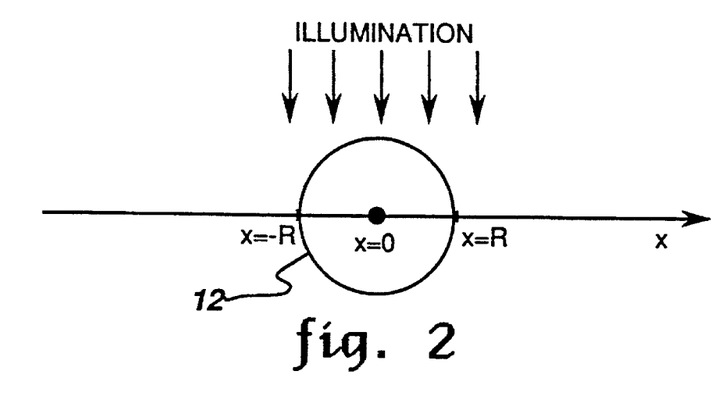
FIG. 2 is a schematic diagram illustrating a geometric configuration for measuring the color of substantially cylindrical polymer samples or strands, such as may be employed in a method for measuring the color of a sample in accordance with the invention.

In order to adequately compensate the RGB digital image for reflectance, it is again desirable to make some assumptions, in this case regarding the intensity of the reflected light. It is not necessary that these simplifying assumptions determine the precise reflectance of the light incident upon the sample, but it is desired that the assumptions prove suitable to compensate the digital image sufficiently to obtain precise measurements of the sample color. Thus, for example, in this particular embodiment, it is assumed that the illumination and viewing geometry illustrated in FIG. 3 is employed, although the invention is not restricted in scope to this geometry. It is also assumed that substantially uniform illumination is present throughout the field of view of the camera, although if this is not the case the illumination compensation previously described may be employed. Likewise, for this particular embodiment, it is assumed that a diffuse object surface substantially uniform color is viewed, and that the object is substantially cylindrical. Under these assumptions, the intensity of the reflected light received by the camera from points on the surface of the cylindrical sample may be substantially in accordance with the following equation:

$$I(x) = I_0 \sqrt{1 - \left(\frac{x}{R}\right)^2} \, , \qquad [9]$$

where $I_0$ is the intensity signal value corresponding to a flat or substantially planar sample with substantially the same surface properties as the strand, and R is the strand radius, as illustrated in FIG. 2. Similar assumptions may be employed for other geometric shapes and viewing environments to derive a relationship regarding the intensity of the reflected light similar to equation [9]. Examples may include point source illumination and Lambertian object reflectance as discussed in *Modern Optical Engineering: The Design of Optical Systems*, written by W. J. Smith and available from McGraw-Hill (1966) and *Elements of Modern Optical Design*, written by D. C. O'Shea and available from John Wiley and Sons (1985). Equation [9] illustrates that the maximum intensity signal values received by the camera correspond to the horizontal location or displacement x=0 in FIG. 2, that is, the location of the surface of the strand immediately above its center. Furthermore, the signal values corresponding to this location provide substantially the same intensity signal values as would be provided by a flat sample of the same material viewed by the camera under substantially the same viewing conditions. Furthermore, equation [9] may now be employed to determine, based on the intensity of the reflected light received by the camera for the substantially cylindrically strand, the intensity of reflected light for a substantially flat or planar sample of the same material viewed under substantially the same viewing conditions. This relationship is provided by the following equation:

$$I_o = I(x) \left(1 - \left(\frac{x}{R}\right)^2\right)^{-1/2}. \qquad [10]$$

It is useful to observe that the location on the surface of the strand that provides the maximum intensity signal value and the location on the surface of the strand providing an intensity signal value that corresponds to that provided by a flat sample is the location on the surface of the sample providing a substantially normal surface with respect to the path of the light emitted by the light source.

For one particular embodiment of a method for measuring the color of a sample in accordance with the invention, the reflectance compensation step may comprise identifying the one or more pixel locations within the digital image corresponding to the position on the surface of the sample oriented substantially perpendicular with respect to the path of the light emitted by the source and employing the color signal value within each color signal array for this pixel location, or for these locations, as the color signal value for that array. Likewise, another alternative embodiment may comprise detecting the peak or "locally" maximum color signal values within each color signal array and averaging or otherwise filtering these peak color signal values to obtain a color signal value for each pixel location in the particular color signal array.

In particular, for this embodiment of a method for measuring the color of a sample in which an RGB digital image is produced, this may comprise measuring the monochrome signal intensity, $I_m$, for each pixel location of the RGB digital image substantially in accordance with the NTSC standard, as described in the aforementioned *Television Engineering Handbook*, by K. B. Benson, via the following equation:

$$I_m(i,j) = 0.3R(i,j) + 0.59G(i,j) + 0.11B(i,j) \qquad [11]$$

where i, j denotes the pixel location and R(i,j), G(i,j), and B(i,j) denote the red, green and blue color signal values in the respective color signal arrays for that pixel location. It will nonetheless be appreciated that where another three color digital image other than an RGB digital image is employed, another intensity signal relationship may be employed.

For each row of the RGB digital image the locally maximum monochrome intensity signals may now be located. A number of techniques may be employed to do this, such as computing discrete approximations of the first and second derivatives of the monochrome intensities in the direction normal to the longitudinal axes of the strands. In this particular embodiment, this direction corresponds to rows of pixels in the digital image. It will now be appreciated that the invention is not restricted in scope to determining the locally maximum intensity signal values along each row, however, due to the particular orientation of the strands with respect to the camera in this particular embodiment, this approach may identify the maximum intensity signal values more efficiently that other approaches. In an embodiment of a method for measuring the color of a sample in accordance with the invention, a reflectance compensated RGB digital image may now be obtained by filtering the RGB signal values corresponding to the pixel locations whose monochrome intensity achieves a locally maximum intensity signal value. The RGB reflectance compensated digital image may likewise be reduced to an RGB color signal for the sample, if desired.

As previously described, by virtue of the chosen illumination and viewing geometry in FIGS. 1 or 3, the resulting RGB signal values corresponding to the pixel locations having the locally maximum monochrome signal intensities also correspond to the RGB signal values for a flat sample illuminated uniformly from above and viewed at substantially the same angle. In an alternative embodiment of a method for measuring the color of a sample in accordance with the invention, to obtain color information about the sample using signal values which do not necessarily correspond to the local maximum image monochrome intensities, the step of compensating for reflectance may comprise relating each or selected three-color signal values in the three-color digital image to those signal values corresponding to a flat sample of the same material and substantially the same color viewed under substantially the same conditions. This may be accomplished, for example, for substantially cylindrical samples by applying equation [10] as previously provided.

It will now be appreciated that the RGB or three-color digital image produced by camera 10 may include background or "nonobject" signal values in various pixel locations for each of the arrays or subimages. Thus, to ultimately produce or transform the RGB digital image into either an RGB color signal or an XYZ color signal for the sample, these nonobject background color signal values should be removed. This may be accomplished, for example, by thresholding the RGB signal values in the RGB digital image. This may take place after the RGB digital image produced by the camera has been either filtered or illumination compensated. Alternatively, this step may be performed after the RGB image has been reflectance compensated. Typically, thresholding the image amounts to removing those color signal values outside the known, relevant range of color signal values for the sample.

Furthermore, an alternative embodiment of a method for measuring the color of a sample in accordance with the invention may include the capability to measure spatial dimensions of the sample, such as the diameter of a strand to thereby accommodate strands of varying sizes. This may be accomplished, for example, by obtaining the diameter from the RGB digital image based, at least in part, on thresholding the image and determining the centers of the strands.

Likewise, in yet another alternative embodiment in accordance with the invention, the sample may not be substantially uniform in color. It may be useful in these situations to measure other properties of the signal values for the sample, such as statistics regarding the RGB signal variability across the one or more samples. Likewise, a sample may include at least two measurably different or distinct colors at two locations on the surface of the sample. As previously described, the digital image produced from the color information provided by camera 10 may be smoothed, illumination compensated, and reflectance compensated, or any thereof. Selected portions of the resulting digital image, particularly a reflectance compensated digital image, may then be averaged or otherwise filtered to measure the distinct colors as needed for manufacturing feedback control, as previously suggested. To accomplish this, geometric features of the sample to be measured may be identified and specific areas of interest on the sample may be located in the digital image. Likewise, this may be performed for corresponding locations on the surface of different samples in order to differentiate color, such as between a standard sample and a sample whose color is being compared with the standard. Likewise, a particular color on the surface of a sample having a plurality of distinctly measurable colors may be identified.

A color sensor in accordance with the invention may provide measurements of color or signal color values in units specified by CIE standards, specifically the tristimulus values, XYZ. In addition, color space signal values for any color space derived from the CIE tristimulus values via CIE or ASTM methods, including, for example, CIE L*u*v*, CIE L*a*b*, may be provided or obtained. Likewise, a three-color camera, such as previously described, may provide color signal values in terms of red, green and blue (RGB) components that are specified by standards developed for and by television broadcasters (NTSC standards in North America, PAL and SECAM standards in other parts of the world, such as described in the aforementioned Benson text). Thus, one aspect of the invention is providing a technique or means for converting color signals or signal values from a three-color, or RGB, camera into the desired tristimulus signals or signal values, XYZ. In an embodiment of a method of measuring the color of a sample in accordance with the invention in which the reflectance compensated RGB digital image is used to provide an RGB color signal measurement, the RGB signal value obtained from the RGB digital image may be transformed to an XYZ color measurement or color signal, as explained in more detail hereinafter.

In actual practice, it is difficult, if not impossible, to specify an exact relationship between NTSC standard RGB color signals or signal values and CIE standard XYZ color signals. This is, at least in part, because most RGB cameras do not adhere closely to the NTSC standard. In addition to possible variations from manufacturer to manufacturer and model to model, there are also potential variations in sensitivity of the individual pixels within any given RGB camera. Due to these sources of variability, a process or method for measuring the color of a sample in accordance with the invention in which XYZ sample color is desired, requires calibrating the particular camera against known color standards to obtain precise XYZ color signal values. In this particular embodiment of the invention, this transformation takes the form of a locally valid affine relationship between known standard tristimulus signal values for a standard sample and measured camera RGB signal values for that sample. Therefore, in this particular embodiment, this relationship is obtained by imaging a sample including a surface color of known tristimulus signal values and comparing that with the RGB signal values obtained. For efficiency, the RGB digital images obtained from known samples used to perform the illumination compensation, as previously described, may also be employed for this transformation, although the invention is not restricted in scope in this respect.

In this particular embodiment, the transformation takes the form of a gain matrix, G, and a offset vector, O, in accordance with the following equation:

$$\begin{bmatrix} X \\ Y \\ Z \end{bmatrix} = \begin{bmatrix} G_{11} & G_{12} & G_{13} \\ G_{21} & G_{22} & G_{23} \\ G_{31} & G_{32} & G_{33} \end{bmatrix} \begin{bmatrix} R \\ G \\ B \end{bmatrix} + \begin{bmatrix} O_1 \\ O_2 \\ O_3 \end{bmatrix}. \quad [12]$$

Again, in this particular embodiment the matrix, G, and the vector, O, may be obtained using standard multilinear regression techniques. Thus, for each local "neighborhood" around the particular RGB signal or signal value, a minimum of three linearly independent standard samples of interest should be imaged to determine G and O. This may be obtained by solving the following least squares equation:

$$\begin{bmatrix} X_1 & X_2 & \ldots & X_t \\ Y_1 & Y_2 & \ldots & Y_t \\ Z_1 & Z_2 & \ldots & Z_t \end{bmatrix} = \quad [13]$$

$$\begin{bmatrix} G_{11} & G_{12} & G_{13} & O_1 \\ G_{21} & G_{22} & G_{23} & O_2 \\ G_{31} & G_{32} & G_{33} & O_3 \end{bmatrix} \begin{bmatrix} \bar{R}_1 & \bar{R}_2 & \ldots & \bar{R}_t \\ \bar{G}_1 & \bar{G}_2 & \ldots & \bar{G}_t \\ \bar{B}_1 & \bar{B}_2 & \ldots & \bar{B}_t \\ 1 & 1 & \ldots & 1 \end{bmatrix},$$

where $X_i$, $Y_i$, and $Z_i$ are the known tristimulus signal values for a substantially flat standard sample substantially uniform in color, and $\bar{R}_i, \bar{G}_i$ and $\bar{B}_i$ are respectively, the average signal values for the red, green and blue arrays of signal values for the RGB digital image obtained for that sample. Likewise, this calibration may be performed after the RGB digital image has been smoothed and illumination compensated, as previously described. The minimum least squares error may be obtained in accordance with the following equation:

$$\begin{bmatrix} G_{11} & G_{12} & G_{13} & O_1 \\ G_{21} & G_{22} & G_{23} & O_2 \\ G_{31} & G_{32} & G_{33} & O_3 \end{bmatrix} = \quad [14]$$

$$\begin{bmatrix} X_1 & X_2 & \ldots & X_t \\ Y_1 & Y_2 & \ldots & Y_t \\ Z_1 & Z_2 & \ldots & Z_t \end{bmatrix} \begin{bmatrix} \bar{R}_1 & \bar{R}_2 & \ldots & \bar{R}_t \\ \bar{G}_1 & \bar{G}_2 & \ldots & \bar{G}_t \\ \bar{B}_1 & \bar{B}_2 & \ldots & \bar{B}_t \\ 1 & 1 & \ldots & 1 \end{bmatrix}^\dagger,$$

where $X^\dagger$ denotes the pseudo-inverse (or Moore-Penrose inverse), such as described in *Linear Algebra and Its Applications*, written by G. Strang and available from Academic Press (1980).

Although, as previously described, the transformation of an RGB signal value to an XYZ signal value may be obtained by employing the minimum least squares technique described, the invention is not restricted in scope to this approach. For example, instead of obtaining one transformation based on all the RGB signal values in the signal value arrays, the RGB signal values at each pixel location in the color signal arrays may be individually transformed based on a minimum least squares approach applied to the RGB digital images obtained for the standard samples. Likewise, the transformation from the RGB color measurement, or signal value, to the XYZ color measurement, or signal value, may alternatively be obtained by a minimum absolute error or other nonlinear approach. Likewise, one locally valid linear transformation may be obtained as previously described. Similarly, a multiplicity of locally valid linear transformations may be obtained for a particular camera and illuminant and viewing arrangement and stored to provide an imaging color sensor in accordance with the invention having the capability to obtain a "rough" or approximate RGB color measurement and use that color measurement to obtain the "closest" locally valid linear transformation to the XYZ signal value. Alternatively, instead of a multiplicity of locally valid linear transformations, as described, a neural net may be employed to accomplish a nonlinear relationship between three-color signal values and XYZ signal values, such as by employing the techniques described in the aforementioned text *Introduction to Artificial Neural Systems*.

It will now be appreciated that reflectance compensation of a three-color, or RGB, digital image, as previously described, provides flexibility regarding the transformation of a three-color, or RGB, digital image for a nonplanar sample to an XYZ color signal for that sample. Because reflectance compensation performs transformation of a digital image of a sample of a particular, nonplanar, shape to a digital image for a substantially planar sample, the conversion or transformation to XYZ color signals, as previously described, need only be based on a digital image for a substantially planar sample without diminishing or reducing the capability to obtain a precise XYZ color signal for alternative sample geometries. Nonetheless, it will likewise be appreciated that significant changes in the color measurement environment, such as changing the light source, changing the viewing orientations, and other possible changes, may indicate the desirability of again calibrating the transformation, as previously described, using standard samples of a known, substantially uniform color. Likewise, once the samples are obtained and the transformation approach determined, as previously described, this calibration step in the process, like the illumination compensation calibration step previously described, may be automated.

Finally, the XYZ color signal or color measurement may be transformed to any one of a number of other color signals or color measurements, such as suggested by CIE methods or other color signal schemes, as described in the aforementioned Wyszecki and Stiles text or the aforementioned Judd and Wyszecki text.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A method of measuring the color of a sample, said method comprising the steps of:
    illuminating the sample with light;
    collecting at least a portion of the light reflected from said sample;
    transforming the collected light reflected from said sample into a three-color digital image; and
    transforming the three-color digital image of said sample into a reflectance compensated three-color digital image and including the step of illumination compensating the three-color digital image.

2. The method of claim 1, wherein the step of transforming the three-color digital image into a reflectance compensated three-color digital image includes the step of electronically filtering the three-color digital image.

3. The method of claim 1, wherein the step of illumination compensating the three-color digital image includes the step of calibrating the illumination compensation for the three-color digital image against at least one three-color digital image produced for at least one standard sample having at least one known color on its surface.

4. The method of claim 1, wherein the three-color digital image comprises an RGB digital image; and
    the reflectance compensated three-color image comprising a reflectance compensated RGB image.

5. The method of claim 1, and further comprising the step of transforming the reflectance compensated three-color digital image into at least one three-color color signal for said sample.

6. A method of measuring the color of a sample, said sample comprising at least one substantially cylindrically-shaped sample, said method comprising the steps of:
    illuminating the sample with light;
    collecting at least a portion of the light reflected from said sample;
    transforming the collected light reflected from said sample into a three-color digital image; and
    transforming the three-color digital image of said sample into a reflectance compensated three-color digital image and including the step of transforming the three-color digital image into a monochrome intensity digital image.

7. The method of claim 6, wherein the monochrome intensity image includes at least a plurality of locally maximum monochrome intensity signal values;
    each of said locally maximum monochrome intensity signal values having a corresponding three-color color signal value;
    the step of transforming the three-color digital image into a reflectance compensated three-color digital image comprising:
    detecting the plurality of locally maximum monochrome intensity signal values; and
    filtering the three-color color signal values corresponding to the detected locally maximum monochrome intensity signal values.

8. A method of measuring the color of a sample, said method comprising the
    illuminating the sample with light;
    collecting at least a portion of the light reflected from said sample;
    transforming the collected light reflected from said sample into three-color digital image;
    transforming the three-color digital image of said sample into a reflectance compensated three-color digital image;
    transforming the reflectance compensated three-color digital image into at least one three-color color signal for said sample; and
    transforming the at least one three-color color signal for said sample into an XYZ color signal for said sample.

9. The method of claims 8, wherein the step of transforming the three-color color signal into an XYZ color signal includes the step of calibrating the last-recited transformation using at least one three-color digital image produced for at least one standard sample having at least one known color on its surface.

10. A method of measuring the color of a sample having pre-determined geometric features, said method comprising the steps of:
    illuminating the sample with light;
    collecting at least a portion of the light reflected from said sample;
    transforming the collected light reflected from said sample into a three-color digital image; and
    detecting the three-color color signal values in the three-color digital image corresponding to the predetermined geometric features of said sample.

11. The method of claim 10, and further comprising the step of transforming the three-color signal values in the three-color digital image corresponding to the detected geometric features into at least one three-color color signal value.

12. The method of claim 10, wherein the step of detecting the three-color color signal values includes the step of transforming the three-color color signal values in the three-color digital image into a reflectance compensated three-color digital image.

13. A device for measuring the color of a nonplanar sample comprising:
   a three-color camera for transforming light received by said camera into electrical signals providing color information, said camera being positioned with respect to said sample to receive at least a portion of any light reflected by said nonplanar sample;
   a signal processor, coupled to said three-color camera, for processing the electrical signals produced by said camera to obtain the color information about said nonplanar sample embedded in the electrical signals;
   said signal processor comprising:
      a frame grabber for transforming the electrical signals into a three-color digital image; and
      a digital image processor, coupled to said frame grabber, for transforming the three-color digital image into at least one three-color color signal for said nonplanar sample.

14. The device of claim 13, and further comprising a light source for illuminating said sample with light.

15. The device of claim 13, wherein said three-color camera comprises an RGB camera and the three linearly independent color signals constitute RGB color signals.

16. The device of claim 13, wherein the at least one three-color color signal for said nonplanar sample constitutes an XYZ color signal.

17. A device for measuring the color of a nonplanar sample, said sample comprising at least one substantially cylindrical strand, said strand having a longitudinal axis, said device comprising:
   a three-color camera for transforming light received by said camera into electrical signals providing color information, said camera being positioned with respect to said sample to receive at least a portion of any light reflected by said nonplanar sample;
   said camera being oriented with respect to said strand so as to receive light having a path of reflection from said strand along a line oriented at a substantially predetermined angle with respect to the longitudinal axis of said strand, the substantially predetermined angle being approximately 45°; and
   a signal processor, coupled to said three-color camera, for processing the electrical signals produced by said camera to obtain the color information about said nonplanar sample embedded in the electrical signals.

18. The device of claim 17, wherein said sample includes at least one other substantially cylindrical strand, said other strand having a longitudinal axis substantially parallel to the longitudinal axis of said at least one strand, the longitudinal axes substantially lying in a plane;
   said camera being oriented with respect to said strands so as to receive light having a path of reflection from said strands along a line oriented at a substantially predetermined angle with respect to said plane, the substantially predetermined angle being approximately 45°.

19. A device for measuring the color of a nonplanar sample wherein said sample comprises a sample including at least two measurably distinct colors at two respective locations on the surface of said sample said device comprising:
   a three-color camera for transforming light received by said camera into electrical signals providing color information, said camera providing electrical signals constituting a three-color digital image of said sample and being positioned with respect to said sample to receive at least a portion of any light reflected by said nonplanar sample; and
   a signal processor, coupled to said three-color camera, for processing the electrical signals produced by said camera to obtain the color information about said nonplanar sample embedded in the electrical signals;
   said signal processor comprising:
      a digital image processor adapted to transform the three-color digital image of said sample to a reflectance compensated three-color digital image of said nonplanar sample;
   said digital image processor being further adapted to process the three-color digital image of said sample so as to differentiate between the distinct colors at the different locations.

20. A device for measuring the color of a nonplanar sample wherein said sample comprises a sample with a plurality of measurably distinct colors on the surface of said sample said device comprising:
   a three-color camera for transforming light received by said camera into electrical signals providing color information, said camera providing electrical signals constituting a three-color digital image of said sample and being positioned with respect to said sample to receive at least a portion of any light reflected by said nonplanar sample; and
   a signal processor, coupled to said three-color camera, for processing the electrical signals produced by said camera to obtain the color information about said nonplanar sample embedded in the electrical signals;
   said signal processor comprising:
   a digital image processor adapted to transform the three-color digital image of said sample to a reflectance compensated three-color digital image of said nonplanar sample;
   said digital image processor being further adapted to process the three-color digital image of said sample so as to identify at least one of the measurably distinct colors on the surface of said sample.

21. A device for measuring the color of a nonplanar sample comprising;
   a three-color camera for transforming light received by said camera into electrical signals providing color information, said camera being positioned with respect to said sample to receive at least a portion of any light reflected by said nonplanar sample; and
   a signal processor, coupled to said three-color camera, for processing the electrical signals produced by said camera to obtain the color information about said nonplanar sample embedded in the electrical signals;
   said signal processor comprising:
      a frame grabber for transforming the electrical signals into a three-color digital image of said sample; and
      a digital image processor, coupled to said frame grabber, said digital image processor being adapted to transform the three-color digital image generated by said frame grabber to a reflectance compensated three-color digital image of said sample.

22. The device at claim 21, wherein said sample comprises at least one substantially cylindrically-shaped sample;
   wherein the digital image processor being adapted to transform the three-color digital image of said sample generated by said frame grabber to a reflectance compensated three-color digital image of said sample.

23. A device for measuring the color of a nonplanar sample comprising:

a three-color camera for transforming light received by said camera into electrical signals providing color information constituting a three-color digital image including three-color signals corresponding to said sample;

a light source for illuminating said sample with light;

the three-color digital image having three-color color signal values corresponding to at least one area on the surface of said sample, said at least one area receiving light emitted by said light source, the emitted light being incident on said sample substantially perpendicular to the surface of said sample, said camera being positioned with respect to said sample to receive at least a portion of any light reflected by said nonplanar sample; and a signal processor, coupled to said three-color camera, for processing the electrical signals produced by said camera to obtain the color information about said nonplanar sample embedded in the electrical signals;

said signal processor comprising a digital image processor adapted to locate the three-color color signal values in the three-color digital image corresponding to said at least one area.

* * * * *